United States Patent

Daniel

[15] 3,637,239
[45] Jan. 25, 1972

[54] THRUST-RESISTANT PIPE JOINT

[72] Inventor: Leonard Irving Daniel, Flagtown, N.J.

[73] Assignee: Johns Manville Corporation, New York, N.Y.

[22] Filed: Oct. 30, 1969

[21] Appl. No.: 872,581

[52] U.S. Cl. ............................285/93, 285/230, 285/321, 285/369
[51] Int. Cl. ..........................................................F16l 35/00
[58] Field of Search..................285/230, 231, 305, 321, 369, 285/344, 93; 277/207 A

[56] References Cited

UNITED STATES PATENTS

| | | | |
|---|---|---|---|
| 2,944,840 | 7/1960 | Wiltse | 285/321 X |
| 3,415,544 | 12/1968 | Hucks | 285/230 X |
| 3,479,068 | 11/1969 | Brittain | 285/321 |

FOREIGN PATENTS OR APPLICATIONS

| | | | |
|---|---|---|---|
| 1,238,801 | 7/1960 | France | 285/305 |
| 1,247,087 | 8/1967 | Germany | 285/321 |

*Primary Examiner*—Dave W. Arola
*Attorney*—John A. McKinney and Robert M. Krone

[57] ABSTRACT

A thrust-resistant joint for pipe which is assembled by inserting an inner pipe section into a sleeve includes a gasket seated in a groove for providing a fluidtight seal. A shoulder on the inner pipe section cooperates with the gasket and groove to indicate the proper relative assembled position of the pipe section and the sleeve. Thrust loads across the pipe joint are transferred between the pipe section and the sleeve by a split locking ring located within a dual diameter annular channel in the sleeve. Assembly of the joint can be accomplished without resorting to a wedging action to seat the locking ring, because the split locking ring can be positioned in a large diameter portion of the annular channel during the assembly procedure and in a smaller diameter portion of the channel that is at least equal in size to the effective diameter of the locking ring after the pipe joint is assembled.

12 Claims, 8 Drawing Figures

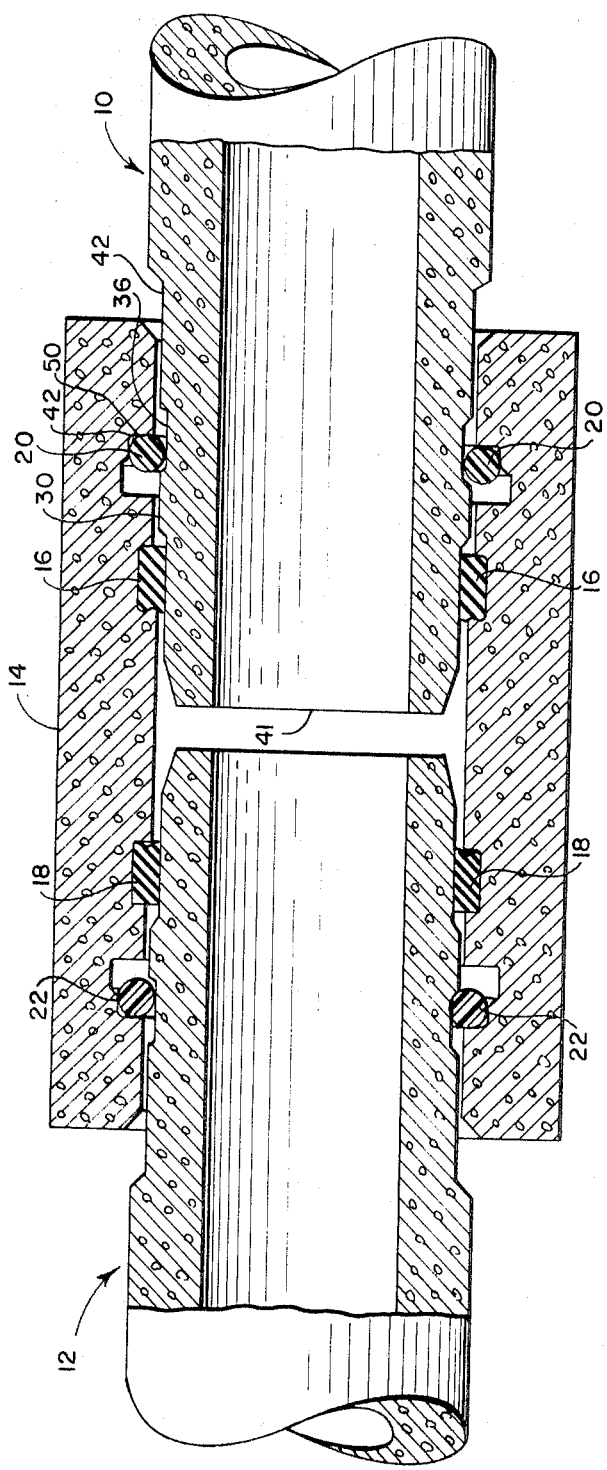
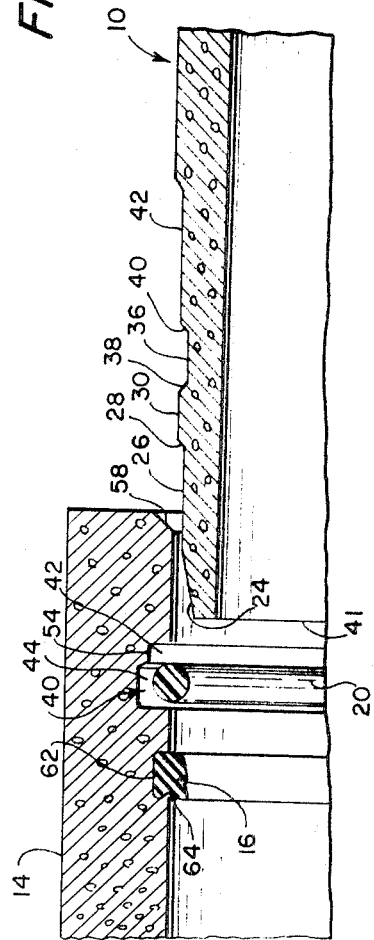
FIG. 1
FIG. 2
INVENTOR
LEONARD IRVING DANIEL
BY John A. McKinney
ATTORNEY PATENTED JAN 25 1972
3,637,239
SHEET 3 OF 3
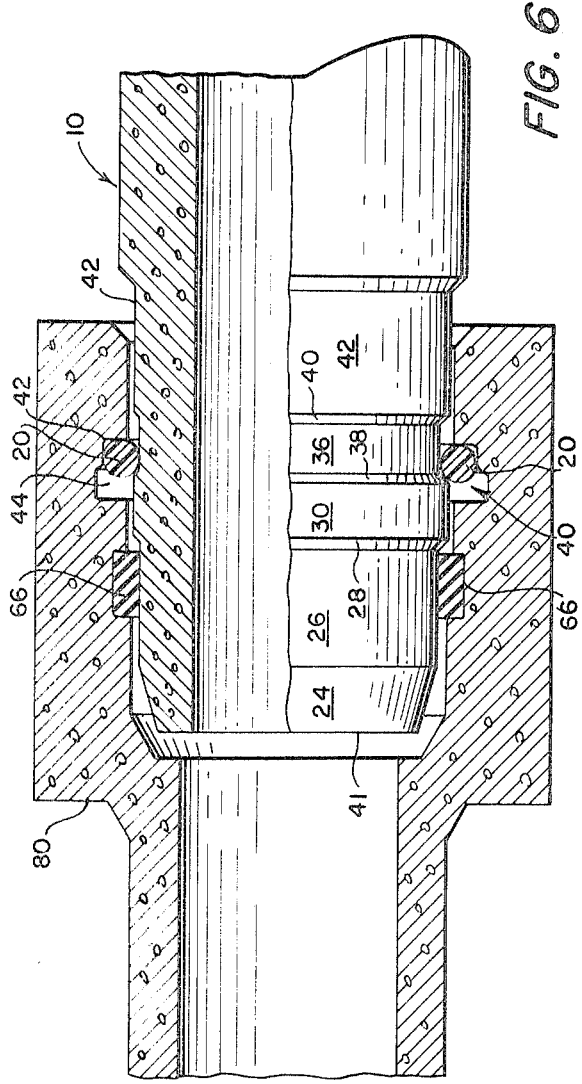
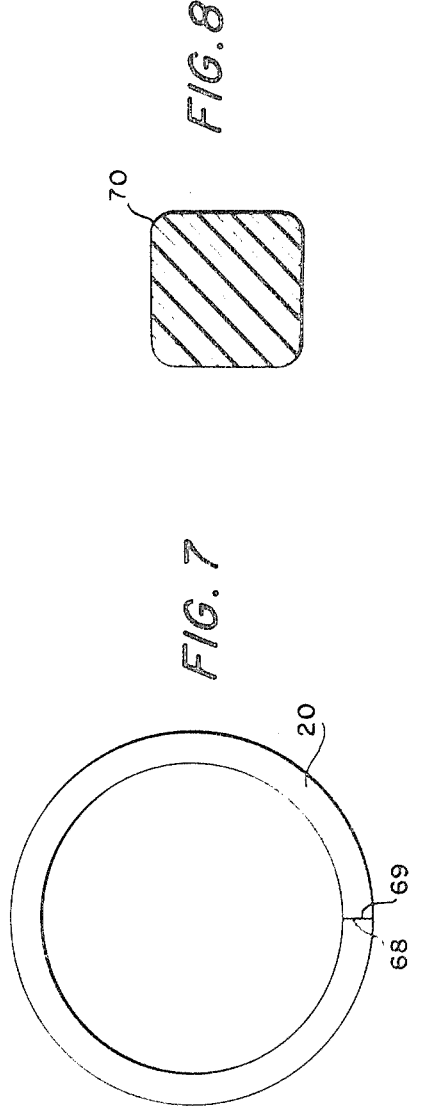
INVENTOR
LEONARD IRVING DANIEL
BY *John A. McKinney*
ATTORNEY

THRUST-RESISTANT PIPE JOINT

BACKGROUND OF THE INVENTION

This invention relates to a thrust resistant pipe joint, and more particularly, to a pipe joint construction in which the simple insertion of the end of a pipe into a sleeve or fitting is sufficient to form a fluidtight seal and to provide a joint that resists disassembly under longitudinal tensile or thrust loads on the pipe. While the specifically described and illustrated embodiments of the invention are primarily directed to sleeve-type asbestos-cement pipe, it will be obvious to those skilled in the art that the invention possesses distinct advantages for other pipe materials such as metals, and plastics and ceramics which possess lower strength characteristics than metals, and for use in a variety of pipe joints, such as bell and spigot joints, or with grooved adapters for connecting to flanged fittings.

DESCRIPTION OF THE PRIOR ART

For over 10 years, the art has been aware of a joint design for asbestos-cement pipe which provides for easy joint assembly by insertion of a pipe into a sleeve containing an elastomeric gasket which produces a watertight seal. A shoulder on the pipe section engages the gasket and tells the pipe assembler where to stop the insertion procedure. The ease of assembly of the insertion joint has been an important factor leading to the widespread commercial adoption of this joint design for asbestos-cement pipe.

One limitation of the above-described joint construction has been its lack of resistance to tensile stresses across the pipe joint caused by line pressure changes. These tensile stresses are applied in a direction reversed from the direction in which force is applied during assembly, and can separate the joint by a simple reversal of the assembly procedure.

In buried pipelines, normal circumferential ground friction is sometimes sufficient to resist these disassembly tendencies of easy-assembly pipe. Frequently, however, it has been necessary to provide concrete thrust blocks at points where easy-assembly, sleeve-type pipe changes direction in order to resist the thrust loading caused by pressure reversals in the line. These concrete thrust blocks require extra effort to emplace and do not provide reliable protection if installed in unstable soil. Further, in some installations space requirements make the use of concrete thrust blocks undesirable or impossible.

Thus, there has existed, for over 10 years, a need for self-locking capability for insertable sleeve-type, asbestos-cement pipe for use in unstable soils, low ground friction soils and for use in aboveground and overhead service where there is no appreciable frictional resistance to disassembly. Numerous attempts have been made to provide a self-locking capability for this type of pipe joint. These attempts have generally involved an external attaching means or the insertion of a locking means after assembly of the pipe joint and have required an excessive amount of time and effort to install.

For example, one European manufacturer of asbestos-cement pipe has designed a thrust resistance coupling that requires field labor to thread a flexible cable into a tangential groove. It is difficult to force the flexible cable through a narrow curving passageway completely around the circumference of the pipe to achieve the desired thrust resistance. Also, the tangential opening in the pipe which serves as an entrance to the passageway must be precisely located, is difficult to produce, and creates a definite manufacturing problem.

In general, the prior art attempts to provide a self-locking capability have sacrificed ease of assembly, the outstanding feature of the sleeve-type, asbestos pipe joint. Since asbestos-cement pipe, particularly in the larger sizes used in water main installations, is too heavy for unassisted manual handling, ease of assembly is an important criterion that cannot be overlooked for couplings to be used in this service.

BRIEF SUMMARY OF THE INVENTION

It is therefore an object of this invention to provide a new and improved thrust-resistant pipe joint which can be assembled by the insertion of a pipe into a sleeve or other fitting.

Another object of the invention is to provide a pipe joint which will resist disassembly stresses without decreasing the ability of the pipe to withstand its rated pressure level.

A further object of the invention is to provide a self-locking capability for a pipe joint without making the pipe joint substantially more difficult to assemble.

A still further object of the invention is to provide a thrust-resistant pipe joint comprising parts that are interchangeable with present commercially available asbestos-cement pipe.

Yet another object of the invention is to provide a thrust-resistant pipe joint without detracting from the fluidtight sealing properties of the pipe joint.

Additional objects and advantages of the invention will be set forth in part in the description which follows and in part will be obvious from the description, or can be learned by practice of the invention.

The self-locking pipe joint of this invention comprises an inner pipe section having a generally cylindrical outer wall surface at its end. Specifically, the end of the pipe section includes an end annular portion of substantially constant outer diameter, and an annular lock ring groove. A second annular portion having a larger outer diameter than the end annular portion is positioned between the end annular portion and the groove. A shoulder joins the annular portions.

A sleeve is provided for receiving the pipe section and has a receiving end comprising a generally cylindrical inner wall surface for receiving the end portion of the inner pipe section. This inner surface has an annular channel spaced axially from the end edge of the receiving end of the sleeve with the channel including an annular assembly portion, and an annular lock portion having a smaller diameter than the assembly portion and positioned between the assembly portion and the end edge of the receiving end of the sleeve. A gasket-receiving groove is provided on the inner wall surface of the sleeve and is axially aligned with a part of the end annular portion of the pipe section. A resilient gasket is located in the gasket-receiving groove and engaged between the gasket-receiving groove and the axially aligned part of the end annular portion to provide a fluidtight seal. A noncompressible slip locking ring is seated between the locking ring groove in the pipe section and the annular lock portion in the sleeve to resist thrust loadings across the pipe joint.

Preferably, the annular lock portion and the annular assembly portion of the channel are connected by a guide shoulder that extends radially outwardly from the lock portion at an oblique angle to the axis of the sleeve to permit the locking ring to slip easily from the assembly portion into the lock portion during assembly of the pipe joint.

It is also preferred that the annular locking ring have a substantially uniform cross section, an unstressed inside diameter slightly smaller than the outside diameter of the lock ring groove, and an unstressed outside diameter that is slightly less than the inner wall surface of the back portion of the annular channel to permit easy insertion of the locking ring into the annular channel.

BRIEF DESCRIPTION OF THE DRAWINGS

The accompanying drawings, which are incorporated in and constitute a part of this specification, illustrate presently preferred embodiments of the invention and, together with the description, serve to explain the principles of the invention.

FIG. 1 is a plan view partially in section taken on a plane through the common longitudinal axis of the elements of a sleeve-type pipe coupling including a pair of pipe joints constructed in accordance with the invention and illustrating the coupling in assembled position;

FIG. 2 is a fragmentary sectional view of the upper right-hand portion of the coupling of FIG. 1 showing the elements in their preassembled position;

FIG. 6 is a plan view, partially in section taken on a plane through the common longitudinal axis, of the elements of a bell and spigot coupling constructed in accordance with the invention, the elements of the coupling being shown in assembled position;

FIG. 7 is an end elevation of the split lock ring illustrated in FIG. 1; and

FIG. 8 illustrates the cross-sectional shape of an alternative embodiment of the lock ring of FIG. 1.

DESCRIPTION OF THE PREFERRED EMBODIMENT

Figure 3:
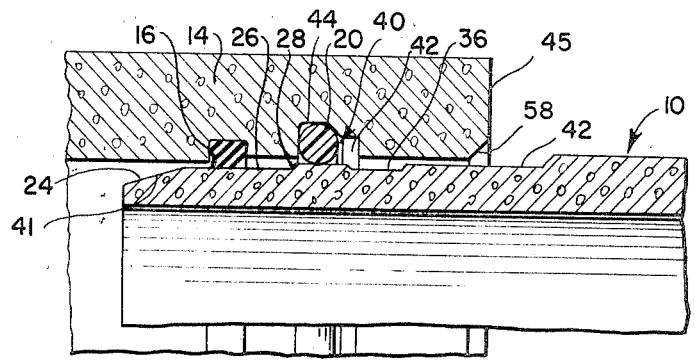
FIGS. 3 and 4 are similar to FIG. 2, but sequentially show the position of the elements of the coupling during assembly of the coupling.

With reference to FIG. 1, a self-locking, sleeve-type pipe coupling is illustrated which comprises a pair of inner pipe sections generally 10 and 12 which are axially spaced from each other. Inner pipe sections 10 and 12 have generally cylindrical outer wall surfaces and are surrounded at their adjacent ends by a sleeve 14 having a generally cylindrical inner wall surface defining an axial opening through sleeve 14 in which the adjacent ends of inner pipe sections 10 and 12 are received. The outer diameters of at least the end portions of the inner pipe sections received within the sleeve are sufficiently smaller than the inner diameter of the sleeve to provide clearance for axial movement of the inner pipe sections relative to the sleeve. A pair of deformable gaskets 16 and 18 are provided to form a fluidtight seal between the inner pipe sections and the sleeve, and a pair of split locking rings 20 and 22 are provided to prevent axial movement of the inner pipe sections relative to the sleeve.

In accordance with the invention, the end of the inner pipe section comprises an end annular portion of substantially constant outer diameter, and a second annular portion having a larger outer diameter than the end annular portion. A shoulder joins the annular portions and extends radially outwardly, preferably at a steep angle to the axis of the inner pipe section. An annular lock ring groove is provided that is spaced axially inwardly from the shoulder. In the specification and claims, the terms "axially inwardly" and "axially outwardly" are used with reference to the end edge of the pipe section or sleeve that forms part of the joint being described, that is, "axially inwardly" refers to a vector extending from an end edge of the joint towards the other end edge of the pipe section or sleeve.

As here embodied, and as best illustrated in FIG. 2, the wall surface of the end of pipe section, generally 10, includes a tapered portion 24 that facilitates the insertion of pipe section 10 into sleeve 14.

An end annular portion 26 of substantially constant outside diameter abuts tapered portion 24. A shoulder 28 connects end annular portion 26 and a second annular portion 30. Shoulder 28 preferably extends radially outwardly from the axis of pipe section 10 at a steep angle which may normally be about 45° to the axis of the inner pipe section.

The axial length of second annular portion 30 is desirably selected to resist laminar shear forces that result from thrust loadings produced by the design hydrostatic pressure. As discussed in detail below, thrust loads caused by line pressure changes result in laminar shearing stresses in second annular portion 30. The shoulder 38 connecting annular portion 30 to the bottom of lock ring groove 35 functions to cooperate with the lock ring to provide the thrust resistance. This shoulder extends at a relatively steep angle to the axis of the pipe and may be as great as 80° to 90°.

With continued reference to FIG. 2, an annular lock ring groove 36 is spaced axially inwardly from shoulder 28 a distance that corresponds to the length of second annular portion 30. In the assembled pipe joint, groove 36 seats lock ring 20 as discussed in more detail below. The axial width of groove 36 exceeds the axial dimension of locking ring 20. The sidewalls or shoulders 38 and 40 of groove 36 extend at oblique angles from the bottom wall of the groove. The oblique angle of sidewall 38 helps prevent stress concentration and failure of sidewall 38 and second annular portion 30 when a sudden change in line pressure occurs. The diameter of the bottom wall of lock ring groove 36 exceeds the diameter of end annular portion 26 to insure that the inner pipe section retains the ability to withstand hydrostatic pressures that it would possess in the absence of the self-locking capability. Advantageously, thrust resistance is provided without requiring the use of an increased wall thickness for pipe section 10. Thus, the pipe section of this invention is capable of being used interchangeable with present commercial, insertable asbestos-cement pipe.

A third annular portion 42 extends, with respect to the end edge 41 of pipe section 10, axially inwardly from lock ring groove 36.

In accordance with the invention, a sleeve is provided with a receiving end having a generally cylindrical inner wall surface for receiving the end of the inner pipe section. More specifically this inner wall surface includes an annular channel spaced axially from the receiving end of the sleeve. The channel includes a lock portion, and an assembly portion which has a larger diameter than the lock portion and is positioned axially inwardly of the lock portion with respect to the end of the outer pipe section. The channel also includes a gasket-receiving groove which, in the assembled joint, is positioned to be axially aligned with the end annular portion of the inner pipe section.

The term "sleeve" as used in the specification and claims refers to any tubular member designed to fit over a pipe section, and should not be construed narrowly to refer only to a coupling such as illustrated in FIG. 1.

Figure 5:
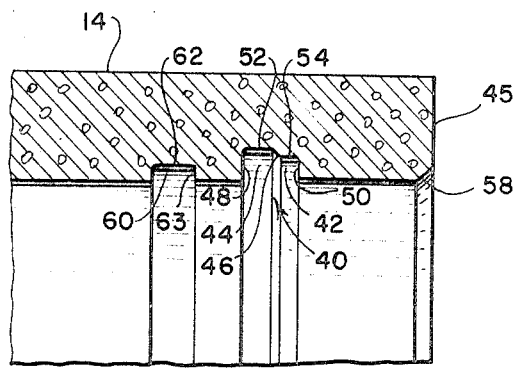
FIG. 5 is a fragmentary view of a portion of the outer pipe section of FIG. 1.

As here embodied, and as illustrated in FIG. 5, the inner wall surface of sleeve 14 includes a dual diameter annular channel 40 generally comprising an annular lock portion 42 and an annular assembly portion 44. Assembly portion 44 has a larger diameter than lock portion 42 and is spaced axially inwardly of lock portion 42 with respect to the end edge 45 of sleeve 14.

Lock portion 42 and assembly portion 44 are connected by a guide shoulder 46 that extends radially outwardly from lock portion 42 at an oblique angle to the axis of sleeve 14 to permit lock ring 20 to slip easily from the assembly portion into lock portion 42 during assembly of the pipe joint.

As illustrated in FIG. 5, sidewall 48 of assembly portion 44 and sidewall 50 of lock portion 42 extend radially outward in a direction that is perpendicular to the axis of sleeve 14, and bottom walls 52 and 54 of the assembly and lock portions, respectively, extend parallel to this axis. This wall configuration in combination with shoulder 46 permits lock ring 20 to slip easily into lock portion 42 and helps prevent sleeve 14 from exerting a wedging force through lock ring 20 onto inner pipe section 10 when a change in line pressure occurs. Substantially all thrust load across the pipe joint is transferred axially rather than radially.

Dual diameter groove 40 is preferably spaced inwardly from end edge 45 a distance that can resist laminar shear stresses caused by changes in line pressure approximately equal to the design hydrostatic load of the sleeve. In the embodiment of FIG. 5, the tensile strength of sleeve 14 is determined by the distance between bottom wall 52 and the outside wall surface of the sleeve. A tapered should 58 is provided at the end edge of sleeve 14 to facilitate insertion of inner pipe section 10.

Figure 4:
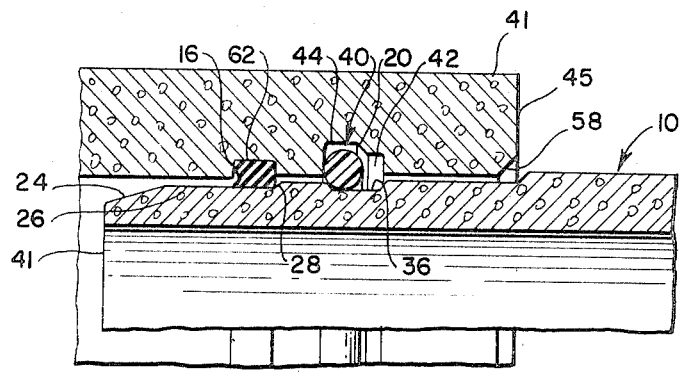

A gasket-receiving groove 60 is spaced axially inwardly of channel 40 relative to end edge 45 of sleeve 14. Groove 60 is positioned so that its radially outer wall, bottom wall 62, is axially aligned with a part of end annular section 26 when the pipe joint is assembled. The distance between sidewall 48 of assembly portion 44 and the adjacent sidewall 63 of groove 60 (FIG. 5) is approximately equal to, or slightly exceeds, the axial length of second annular portion 30 as seen in FIG. 4, so that when shoulder 28 engages gasket 16 during assembly, locking ring 20 is seated in groove 36.

In accordance with the invention, a resilient gasket extends between the gasket-receiving groove and the end annular portion when the pipe joint is assembled and provides a fluidtight seal resisting passage of fluid from the interior of the pipe joint.

A preferred configuration for the resilient gasket prior to assembly is illustrated in FIG. 2. As there illustrated, resilient gasket 16 includes an annular recess 64 at one end that can receive fluid under pressure to cause the lips at opposite ends of recess 64 to expand into tight engagement with groove 60 and end annular portion 26. However, it should be understood that other unstressed gasket sealing configurations can be used in the pipe joint of this invention, such as the basically rectangular gasket 66 illustrated in FIG. 6, since the gasket is deformed by assembly and/or line pressure. The gasket can be of rubber, synthetic rubber, or any suitable resilient and deformable plastic or elastomeric material. The gasket should be more easily deformed than the material of the pipe section of the sleeve.

Preferably, the inside diameter of the gasket in its relaxed state is slightly smaller than the outside diameter of end annular portion 26 so that the basket is stretched somewhat when placed on the inner pipe section. The outside diameter of the gasket when relaxed is preferably substantially equal to the diameter of gasket-receiving groove 60. The initial radial thickness of each of the gaskets, in its relaxed or undeformed state, thus is desirably somewhat greater than the distance between the radially outer or bottom wall 62 of groove 60 and the axially aligned portion of the outer periphery of the end annular portion 26 of the inner pipe section, so that the gasket is flattened to some extent in a radial direction and deformed outwardly in an axial direction in its assembled condition.

In the pipe joint of this invention, a noncompressible split locking ring is seated between the locking ring groove in the pipe section and the annular lock portion of the annular channel in the sleeve. Preferably, the locking ring has a uniform cross section to facilitate assembly of the pipe joint and to uniformly stress the adjacent annular portions of the pipe section and the sleeve.

A split locking ring 20 of circular cross section is illustrated in the embodiments of FIGS. 1-4, and FIG. 6. This locking ring in its normal unstressed state has a generally annular shape and has its ends 68 and 69 touching as in FIG. 7. The split locking ring has an unstressed inside diameter slightly smaller than the outside diameter of lock ring groove 36 so that locking ring 20 is expanded slightly during the assembly procedure to a condition in which the ends of the locking ring do not touch. The unstressed outside diameter of locking ring 20 is slightly smaller than the inside diameter of the inner diameter of the radially outer wall of the lock portion 42 to permit easy insertion of locking ring 20 into the annular channel. In placing the locking ring through the end portion of the sleeve 14, the split ends are slightly displaced, inserted through the sleeve and then allowed to expand to the natural diameter in the annular channel.

The radial thickness of locking ring 20 is selected to be no larger than the radial distance between the bottom wall of groove 36 (illustrated in FIG. 2) and the bottom wall 54 of lock portion 42 so that tensile force between the pipe sections is transferred axially across locking ring 20, and does not create a wedging action that could axially stress the pipe and weaken its resistance to hydrostatic loads.

When the thrust-resistant joint of the instant invention is used in its preferred embodiment with asbestos-cement pipe, particularly advantageous results are obtained when the edge of the locking ring contacting the shoulder 38 of the annular portion 30 to provide the thrust resistance is arcuate. Also, it has been found that satisfactory results are not obtained if the locking ring comprises a rigid hard material such as a steel rod since, under some joint deformation, the steel rod tends to remain rigid and not deform slightly to distribute the load. Also, a practical thrust resistance is not obtained if the locking ring comprises a deformable material such as rubber of a durometer similar to the sealing gasket. In the commercial embodiment of the invention, the locking ring has been formed from a thermoplastic material having a circular cross section or a square cross section with rounded corners particularly in the area contacting the shoulder 38 of the annular portion 30. Typical materials include synthetic resins such as acrylics and phenolics that resist cold flow under pressure and possess a shear strength over 2,000 p.s.i. For example, "Lucite" and acrylic polymer available from E. I. du Pont de Nemours & Co. Inc. Is a suitable material. Frequently, to achieve the desired strength properties for the split locking ring, it is desirable to include a fibrous reinforcing material such as glass, nylon, or asbestos in the resin. Rings machined or cut from flat laminated phenolic-asbestos sheets have also proved to be satisfactory. Desirably, the locking ring is solvent and corrosion resistant.

With respect to FIGS. 3 and 4, the cross section of locking ring 20 includes curved surfaces as its upper right and lower left portions to avoid stress concentration in the sleeve and pipe section and to enable the locking ring to easily slip into its assembled position in lock portion 42 of annular channel 40.

Thus, if a rectangular lock ring 70 such as illustrated in FIG. 8 is utilized, the parallel faces of the lock ring should be connected by curved surfaces.

The material of locking ring 20 possesses an elastic memory so that the locking ring snaps back into snug engagement with the bottom wall of groove 36 after the locking ring is radially expanded during its passage over second annular portion 30.

With reference to FIG. 6, it can be seen that the basic structure of the pipe joint of this invention can be used in a bell and spigot coupling with the sleeve comprising bell section 80. It will be apparent to those skilled in the art, that the sleeve can comprise an adapter having an annular channel 40 and a gasket-receiving groove 60.

The spigot or inner pipe section is formed and designated in the same manner as inner pipe section 10 in the preceding figures. The gasket-receiving groove and dual diameter annular channel 40 formed in bell section 80 have the shape in cross section of the corresponding elements of sleeve 14 of FIGS. 1-5.

The functions of the novel structural features of the pipe joint of this invention will be more clearly understood from the following description of the method of assembly of the pipe joint. With reference to FIG. 2, the wall surfaces at the end of the inner pipe section 10, the walls of groove 60 and gasket 16 are coated with a suitable lubricant. Pipe section 10 and sleeve 14 are then placed in the coaxially aligned relationship shown in FIG. 2 with gasket 16 positioned in groove 60 and split locking ring 20 positioned in assembly portion 44 of the dual diameter annular channel 40.

The split in locking ring 20 should be in the bottom of annular channel 40 adjacent ground level during assembly so that the intruding pipe nose picks up and seats the ring equally around second annular portion 30. This is desirable since, as illustrated in FIG. 2, the top of the ring 20 is naturally spaced somewhat from the inner surface of the annular channel. Thus, any tendency to produce an axial displacement of the split portion of the locking ring is eliminated since the split portion when at the bottom is heated well within the walls of the annular channel.

After gasket 16 and split locking ring 20 are positioned as shown in FIG. 2, the end of inner pipe section 10 is pulled or pushed into sleeve 14. During the initial portion of the pulling or pushing procedure, tapered portion 24 on inner pipe section 10 and tapered portion 58 on the sleeve facilitate the entry of the inner pipe section into the sleeve. Split locking ring 20 is expanded to a larger effective diameter when it passes over second annular portion 30. This expansion is possible, as illustrated in FIG. 3, because the locking ring 20 at this time can expand radially outwardly into the annular channel provided by assembly portion 44 of dual diameter channel 40.

As shown in FIG. 4, the insertion of pipe section 10 into sleeve 14 continues until pipe section 10 is seated with its shoulder 28 against gasket 16. As there illustrated, shoulder 28, in conjunction with gasket 16, spaces the adjacent end of inner pipe section 10 automatically at a desired distance from the end of sleeve 14 because relative axial motion of the pipe section and the sleeve is stopped when gasket 16 engages shoulder 28. This positive spacing action is especially desirable for large diameter fibro-cement pipe where machines must be used to assist in the assembly because of the weight of the pipe. It can be seen that a precise alignment of inner pipe section 10 and sleeve 14 insures that locking ring 20, lock ring groove 36 and annular channel 40 are aligned as shown in FIG. 4.

In the subterranean installation of fibro-cement pipe, it is desirable to seat split locking ring 20 in locking portion 42 of dual diameter groove 40 before application of line pressure to the joint. However, it is noted that this seating can be accomplished by deliberately introducing a thrust load on the joint through the application of line pressure. Preferably this seating step, which changes the relative positions of the inner and outer pipe sections from the longitudinal alignment of FIG. 4, to the longitudinal alignment of FIG. 1, is accomplished in the field by pulling axially on one or more pipe joints to seat the locking ring in lock portion 42 of channel 40.

In the assembled position shown in FIG. 1, split locking ring 20 is capable of transferring thrust loads in an axial direction caused by changes in the line pressure and of placing the second annular section 30 and wall 50 in laminar shearing stress. The diameter of lock portion 42 is at least equal to the effective diameter of locking ring 20 when seated in groove 36. Thus, locking ring 20 transfers thrust loss without creating radial stresses which would lessen the ability of the pipe sections to withstand hydrostatically induced tensile stresses.

In summary, the present invention provides a thrust-resistant, self-locking pipe joint which is easy to assemble, and which will resist disassembly stresses without decreasing the ability of the pipe to withstand its rated hydrostatic pressure level. Because the end portion of the inner pipe section does not need to be grooved deeply, the self-locking pipe joint can be made from pipe sections that are interchangeable with present commercially available asbestos-cement pipe. The self-locking feature of the present pipe joint does not detract from the fluidtight sealing properties of the pipe joint, as no adverse additional stress is placed on the sealing gasket upon the occurrence of a thrust load.

What I claim is:

1. A thrust-resistant pipe joint for confining a fluid therein comprising:
   a. a pipe section having a generally cylindrical outer wall surface at one end of said pipe section, said end of said pipe section comprising an end annular portion of substantially constant outer diameter, and annular lock ring groove, a second annular portion having a larger outer diameter than said end annular portion and positioned between said end annular portion and said lock ring groove;
   b. a sleeve having a receiving end comprising a generally cylindrical inner wall surface for receiving said end of said pipe section, said inner wall surface of said sleeve including an annular channel spaced axially from the end edge of said sleeve, said channel including an annular assembly portion, and an annular lock portion having a smaller diameter than said assembly portion and positioned between said assembly portion and said end edge of sleeve; and a gasket-receiving groove in said sleeve;
   c. a resilient gasket located in said gasket-receiving groove and engaged between said gasket-receiving groove and said end annular portion of said pipe section to provide a fluidtight seal;
   d. a noncompressible split locking ring engaged between an end wall of said lock ring groove in said pipe section and said annular lock portion in said sleeve to resist thrust loading across the pipe joint; and,
   e. annular shoulder means on said pipe section for engagement with said resilient gasket for positioning said pipe section relative to said sleeve so that said lock ring groove, said split locking ring, and said annular lock portion are in proper position for cooperation.

2. The pipe joint of claim 1 in which said annular lock portion and said annular assembly portion of said channel are connected by a guide shoulder that extends radially outwardly from said lock portion at an oblique angle to the axis of said sleeve to permit said locking ring to slip easily from said assembly portion into said lock portion during assembly of the pipe joint.

3. The pipe joint of claim 1 in which the cross section of said locking ring is circular.

4. The pipe joint of claim 1 in which said locking ring includes two pairs of planar parallel side surfaces connected by smoothly curving surfaces.

5. A thrust-resistant pipe joint for confining a fluid therein comprising:
   a. a pipe section formed of hardened, compressed, fibro-cement material and having a generally cylindrical outer wall surface at the end of said pipe section, said end of said pipe section comprising an end annular portion of substantially constant outer diameter, an annular lock ring groove extending radially inwardly from said outer wall surface, a second annular portion having a larger outer diameter than said end annular portion and positioned between said end annular portion and said lock ring groove;
   b. a sleeve formed of hardened, compressed, fibro-cement material and having a receiving end including a generally cylindrical inner wall surface for receiving said end of said pipe section, said sleeve having a dual diameter annular channel spaced axially from the end edge of said sleeve and formed generally radially outwardly from said inner wall surface, said channel including an annular assembly portion, and annular lock portion having a smaller diameter than said assembly portion and positioned between said assembly portion and said end edge of said sleeve, and a guide shoulder connecting said lock portion and said assembly portion and extending radially outwardly from said lock portion at an oblique angle to the axis of said sleeve; and a gasket-receiving groove in said sleeve;
   c. a resilient deformable gasket located in said gasket-receiving groove and engaged between said gasket-receiving groove and said end annular portion to provide a fluidtight seal; and
   d. a noncompressible split locking ring of substantially uniform cross section engaged between and end wall of said locking groove in said pipe section and said annular lock portion in said sleeve for resisting thrust loads across the pipe joint, said locking ring having an unstressed inside diameter that is slightly less than the outside diameter of the lock ring groove, and an unstressed outside diameter that is slightly smaller than the inside diameter of said lock portion of said annular channel to permit easy insertion of said locking ring into said annular channel.

6. The pipe joint of claim 5 in which the diameter of the bottom wall of said lock ring groove of said pipe section is at least as large as the diameter of said annular portion to insure that said pipe section retains the ability to withstand hydrostatic pressures that it would possess in the absence of the thrust-resistant capability.

7. The pipe joint of claim 5 wherein:
   a. said locking ring comprises synthetic resins that resist cold flow under pressure and possess a shear strength over 2,000 p.s.i.

8. The pipe joint of claim 7 in which the cross section of said locking ring is circular.

9. The pipe joint of claim 7 in which the cross section of said locking ring includes two pairs of substantially planar parallel side surfaces connected by curving surfaces.

10. The pipe joint of claim 5 in which said lock portion of said annular channel is formed by a sidewall that extends radially outwardly from said inner wall surface of said sleeve and a bottom wall that extends for a portion of its length substantially parallel to the axis of said sleeve.

11. The pipe joint of claim 5 in which said assembly portion of said annular channel is formed by a sidewall that extends radially outwardly from said inner wall surface of said sleeve and a bottom wall, and said lock portion is formed by a sidewall that extends radially outwardly from said inner wall surface of said sleeve and a bottom wall that extends substantially parallel to the axis of said sleeve.

12. The pipe joint of claim 11 in which the distance between said sidewall of said assembly portion and said gasket-receiving groove of said sleeve is approximately equal to the axial length of said second annular portion to insure engaging said split locking ring in said lock ring groove.

* * * * *